Sept. 15, 1964  W. BOYD ETAL  3,149,045
FUEL CHARGING AND DISCHARGING FOR A GAS COOLED, CERAMIC
FUELLED, NUCLEAR POWER REACTOR
Filed Aug. 4, 1959  12 Sheets-Sheet 1

INVENTORS
WINNETT BOYD
J. ARTHUR PAGET
VERNALD G. LYNN
BY- *Smart + Biggar.*
ATTORNEYS.

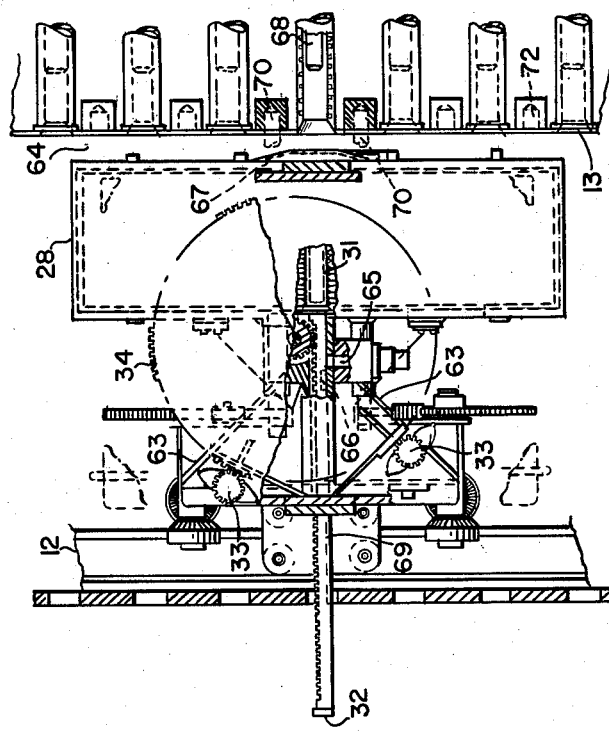
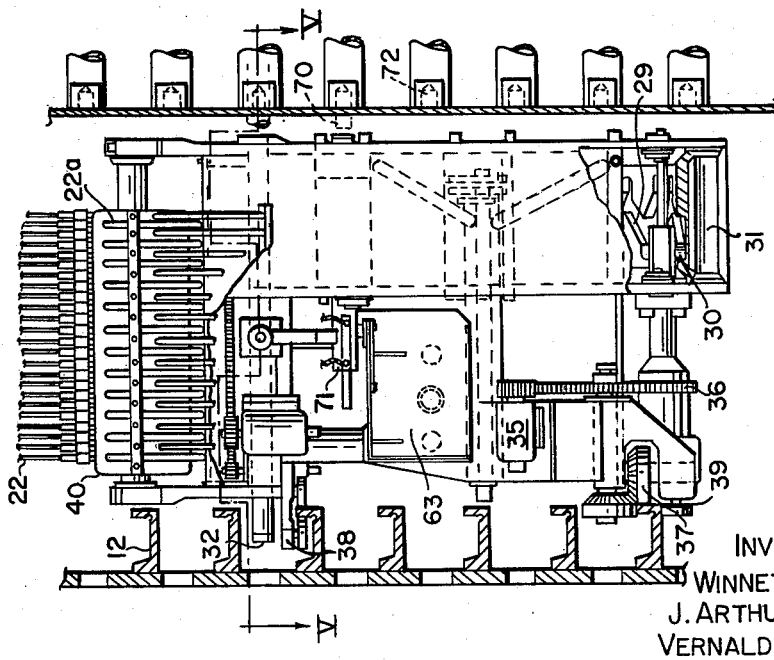

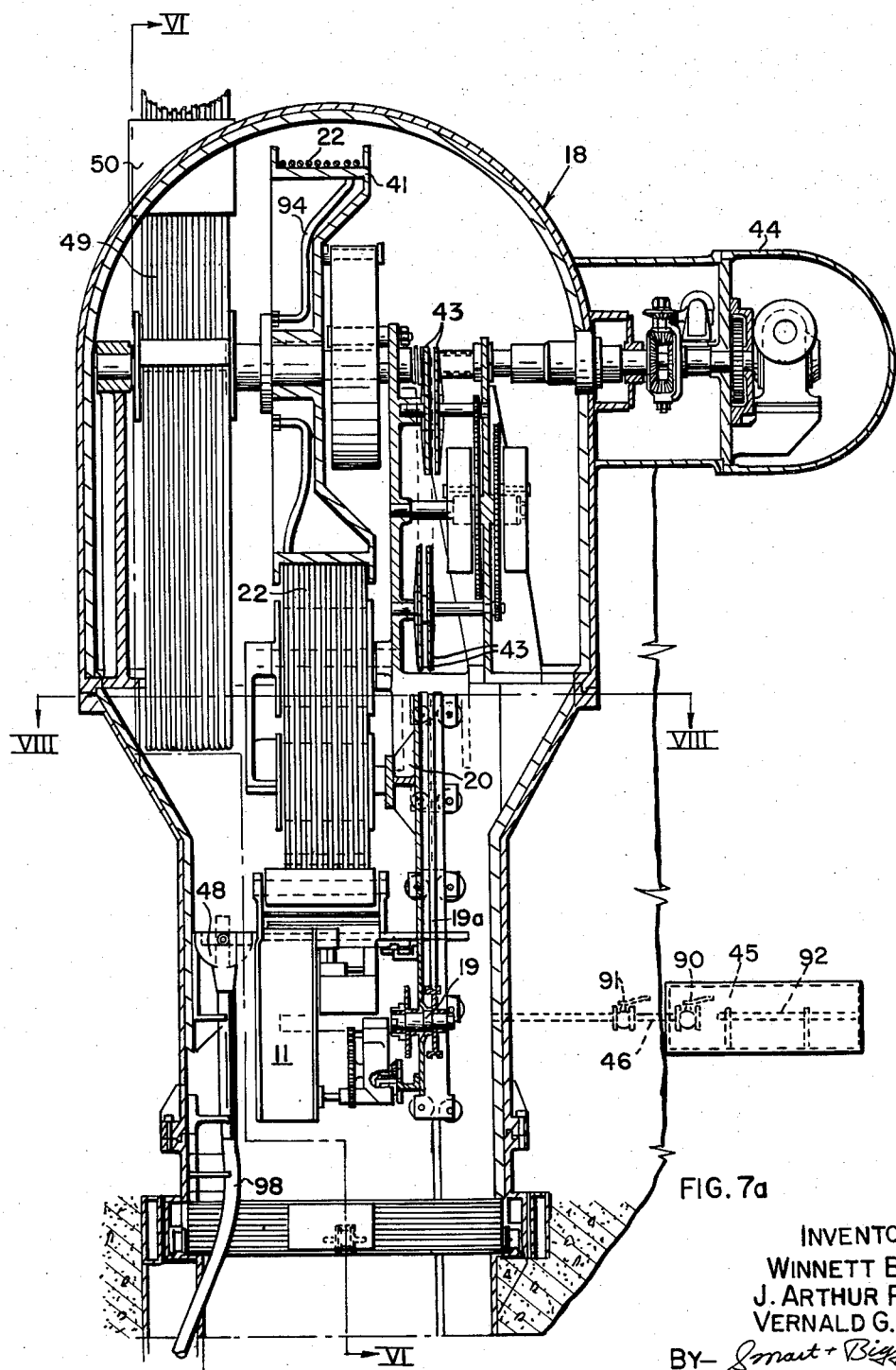

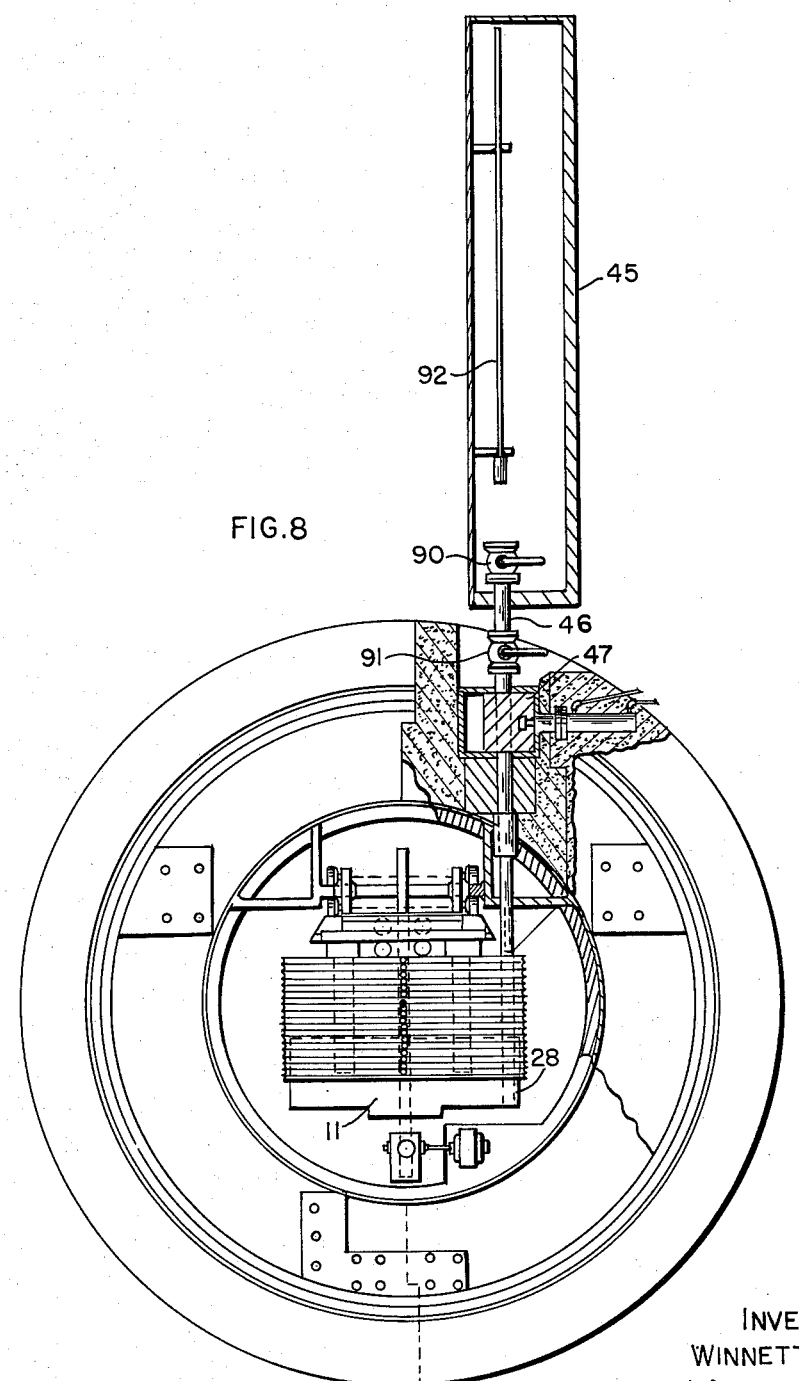

INVENTORS
WINNETT BOYD
J. ARTHUR PAGET
VERNALD G. LYNN

BY- Smart + Biggar

ATTORNEYS.

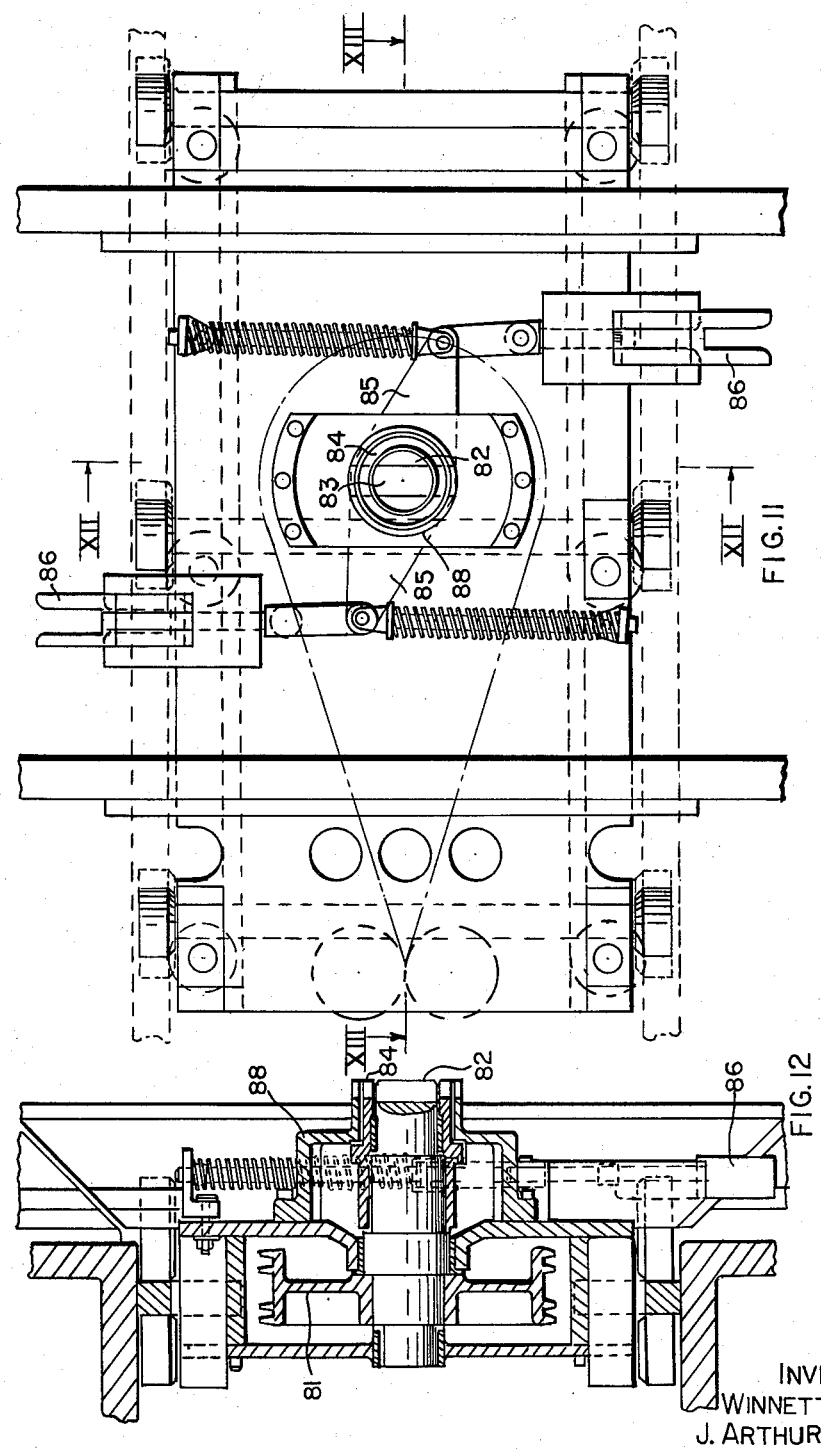

United States Patent Office 3,149,045
Patented Sept. 15, 1964

3,149,045
FUEL CHARGING AND DISCHARGING FOR A GAS COOLED, CERAMIC FUELLED, NUCLEAR POWER REACTOR
Winnett Boyd, Bobcaygeon, Ontario, John Arthur Paget, Boucherville, Quebec, and Vernald Gilbert Lynn, Montreal, Quebec, Canada, assignors, by mesne assignments, to Arthur D. Little, Inc., Cambridge, Mass., a corporation of Massachusetts
Filed Aug. 4, 1959, Ser. No. 831,603
8 Claims. (Cl. 176—30)

The invention relates to fuel charging and discharging apparatus for a horizontally fuelled closed circuit gas cooled nuclear reactor.

The problems of charging and discharging fuel into and out of a nuclear reactor have become acute with the advent of nuclear power. Heretofore nuclear reactors were used only for plutonium production and experimental purposes and, therefore, could be shut down as required for fuel charging and discharging which, even under shut-down conditions, was not an easy operation. However, nuclear reactors which are used as the heat sources in thermo-electric power generating stations cannot readily be shut down for this purpose and thus the problems of charging and discharging fuel into and out of these reactors are magnified enormously. Indeed, the fuel handling problem usually has a determining influence on the overall design of power reactors.

In gas cooled power reactor of the "Calder Hall" type the fuel elements are usually arranged vertically and being metallic they can be handled from above in tension. This results in a rather simple cable arrangement for hoisting and lowering the fuel elements. For other reasons, however, this system becomes rather complicated in practice. One of the "Calder Hall" type reactors that is currently being built for the South of Scotland Electricity Board at Hunterston has a bottom fuel handling arrangement but this also suffers from similar complications. In short, the fuel handling systems for gas cooled graphite moderated reactors of the "Calder Hall" type in which the fuel elements are arranged vertically tend to be complicated, cumberson and costly.

According to the present invention, improved fuel charging and discharging apparatus for a horizontally fuelled closed circuit gas cooled nuclear reactor is provided by completely housing the working machinery in pressure vessels which are permanently attached to the main reactor pressure vessel and in which the working machinery is exposed at all times to the gas pressure prevailing in the reactor pressure vessel. Preferably, the maximum gas temperature to which the working machinery is exposed is that prevailing at the inlet side of the gas circuit at the reactor. Also, it is preferred to have isolating valves disposed between the main reactor pressure vessel and the ends of the pressure vessels into which the working machinery is retractable.

According to a preferred embodiment of the invention, fuel charging and discharging apparatus for a bi-directional horizontally fuelled closed circuit gas cooled nuclear reactor comprises two charge-discharge machines, two centrally interrupted horizontal static track systems one opposite each fuelling face of the reactor within the reactor pressure vessel on which the aforementioned charge-discharge machines run, two centrally intersecting vertical static track systems extending upwards from the reactor pressure vessel in two vertical elevator shafts equipped with isolating valves and shielding gates, two elevator dollies which run on the aforementioned vertical static tracks carrying two horizontal tracks which can be interlocked with any corresponding pair of the aforementioned horizontal static tracks, two guide sheave dollies which rest on the tops of the aforementioned elevator dollies but are stopped at the junctions of the elevator shafts and reactor pressure vessel, two enlargements on the tops of the aforementioned elevator shafts wherein are contained: the machinery for raising, lowering and locking to the horizontal tracks the aforementioned elevator dollies, the machinery for reeling in and paying out the hoses and cables from static bulkhead connections to the aforementioned charge-discharge machines, the gas locks and shielding gates through which the new fuel elements are inserted, the spent fuel element tippers, and the inlet ends of the spent fuel element discharge pipes; the two spent fuel element discharge pipes being adapted to discharge through a two valve liquid lock and a liquid expansion tank into a liquid filled spent fuel element flask.

Fuel charging and discharging apparatus, in accordance with the invention, is particularly suited to a high or medium temperature gas cooled reactor having horizontal fuel element channels. The apparatus is capable of handling ceramic fuel elements which normally must be pushed into place rather than lowered into place as is possible with metallic fuel elements possessing high tensile strength. The invention has the important advantage of avoiding the difficulty present in most prior systems of frequently making a temporary fluid-tight joint between the charging and discharging machine and the reactor cooling circuit. The maintenance of satisfactory sealing surfaces for the required fluid-tight joints has been an inherent source of unreliability in previously known apparatus of this type. Apparatus according to the invention avoids many difficulties because the fuel charging and discharging apparatus operates completely within the reactor cooling circuit but has the feature that all working mechanisms are replaceable as a unit without shutting down the reactor. The apparatus lends itself to the use of an optical system for inspecting the charging faces of the reactor during operation, and the same optical system can be used in conection with locating and controlling the operation of, the charge-discharge machines.

The invention will be described further with reference to the accompanying drawings, in which:

FIGURE 4 is an elevation of the charge-discharge machine shown in FIGURE 3;

FIGURE 5 is a sectional plan taken on the line V—V of FIGURE 4;

FIGURE 7A is a section taken on the line VII—VII of FIGURE 6;

FIGURE 8 is a sectional plan taken on the line VIII—VIII of FIGURE 7A;

FIGURE 11 is a detail view of part of the locking mechanism of the apparatus shown in FIGURE 10;

FIGURE 12 is a vertical cross section taken on the line XII—XII of FIGURE 11;

Figure 1:
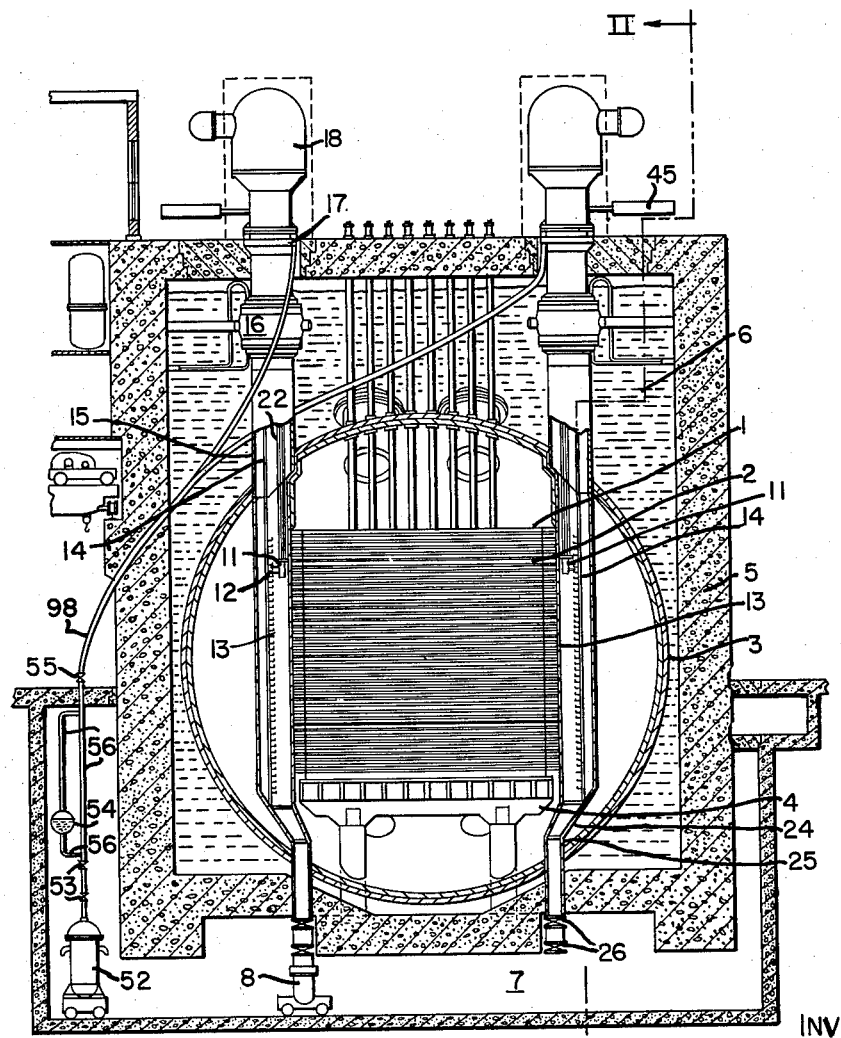
FIGURE 1 is a section taken on the line I—I of FIGURE 2, showing a reactor equipped with fuel charging and discharging apparatus in accordance with the invention.
Figure 2:
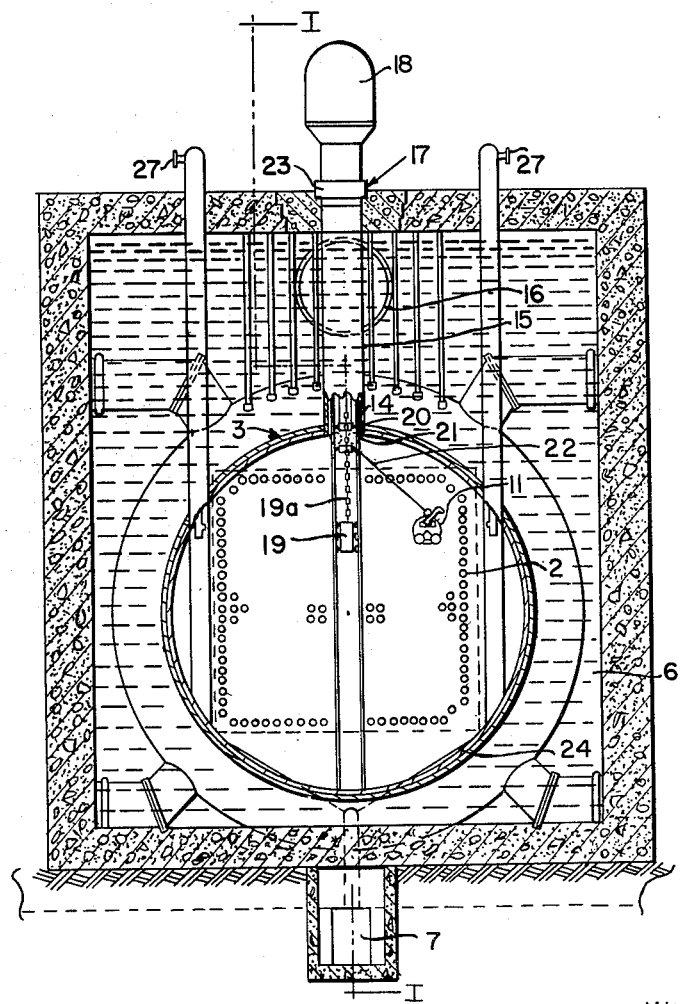
FIGURE 2 is a section taken on the line II—II of FIGURE 1.

FIGURES 1 and 2 illustrate the general arrangement of a fuel handling system according to the invention as well as its relationship to the reactor, the shielding and the operating floors. In FIGURE 1, which is a vertical cross section I—I of FIGURE 2, graphite moderated reactor 1 is shown with its horizontal fuel channels 2 and spherical pressure vessel 3. The reactor is supported by a support structure 4 and has concrete shielding 5 containing cooling and shielding water 6. Underneath the entire reactor structure is a narrow cross passage 7 to accommodate a debris removal flask 8, the function of which will be explained later.

In this nuclear reactor the fuel elements are arranged with their longitudinal axes horizontal and thus when in the reactor the fuel elements lie horizontally in the fuel channels 2. Also, the fuel elements are relatively small being approximately 12 inches long and about 2 inches outside diameter, so they can be handled by relatively small machines. Also, in this reactor the coolant is a gas under pressure so the fuel handling devices must be such that they will fit within normal types of pressure vessels such as cylinders and spheres. Finally the prime movers of the fuel handling devices must be either gas or electrically operated because the accidental ingress of a foreign material such as hydraulic fluid to the reactor coolant gas cannot be countenanced.

A pair of charge-discharge machines 11, which will be described in detail later are arranged to operate over the full area of the reactor fueling faces 13. The charge-discharge machines 11 are provided with wheels which run of horizontal tracks 12 located opposite the reactor fuelling faces 13 and appropriately supported. These horizontal tracks 12 are interrupted at their mid points by pairs of vertical tracks 14 (FIGURE 2) which run upwards through cylindrical elevator shafts 15, isolating valves 16, shielding gates 17 and into the elevator heads 18. These last four items namely 15, 16, 17, and 18, are gas-tight devices and are filled with the reactor cooling gas at the prevailing pressure and temperature. Running on the vertical tracks 14 as shown in FIGURE 2, are two dollies 19 which are raised and lowered by chains 19a which extend downwards from the elevator heads 18 and are operated by mechanisms within the elevator heads 18. Also running on the vertical tracks 14 (FIGURE 2) are two dollies 20 on each of which are mounted two guide sheaves 21. These dollies 20 are raised and lowered by the dollies 19 but special stops on the vertical tracks 14 prevent them from moving below the junctures of the elevator shafts 15 with the spherical reactor pressure vessel 3.

Power reaches the charge-discharge machines 11 through flat multiple core flexible metallic hoses 22 (FIGURE 2) which are layer coiled on large clock spring loaded sheaves within the elevator heads 18.

The elevator shafts are each fitted with spherical type isolating valves 16 in the bores of which are sections of the vertical tracks 14. These valves 16 are required to allow the elevator heads 18 along with the charge-discharge machines 11 and dollies 19 and 20 to be removed for servicing without depressurizing the reactor circuit. The hollow balls of the isolating valves 16 are filled with water and so when they are closed they will provide a substantial measure of shielding. To provide a measure of shielding when the isolating valves 16 are open and the charge-discharge machines 11 are in operation two shielding gates 17 with diametrically split gates 23 are provided. The gates 23 themselves have slots which accommodate the chains 19a and the hoses 22 when the charge-discharge machines 11 and dollies 19 and 20 are below them.

Below the pile charging faces 13 are cone shaped funnels 24 which contract to circular pipes 25 at and below the reactor pressure vessel 3. The bottom ends of the pipes 25 are fitted with double valves 26 which can be operated as gas locks. The purpose of the funnels 24, the pipes 25 and the valves 26 is to permit the removal of any fuel elements, with the aid of the debris flask 8, which may accidentally fall out of either the reactor 1 or the charge-discharge machines 11.

The personnel operating the reactor are enabled to stop the dollies 19 in line with the proper horizontal track 12 by viewing through telescoping periscopes 27 (FIGURE 2). The periscopes 27 can also be used to sight on appropriate mirrors on the charge-discharge machines 11 for the purpose of observing the positions of the charge-discharge machines on the horizontal tracks 12.

Figure 3:
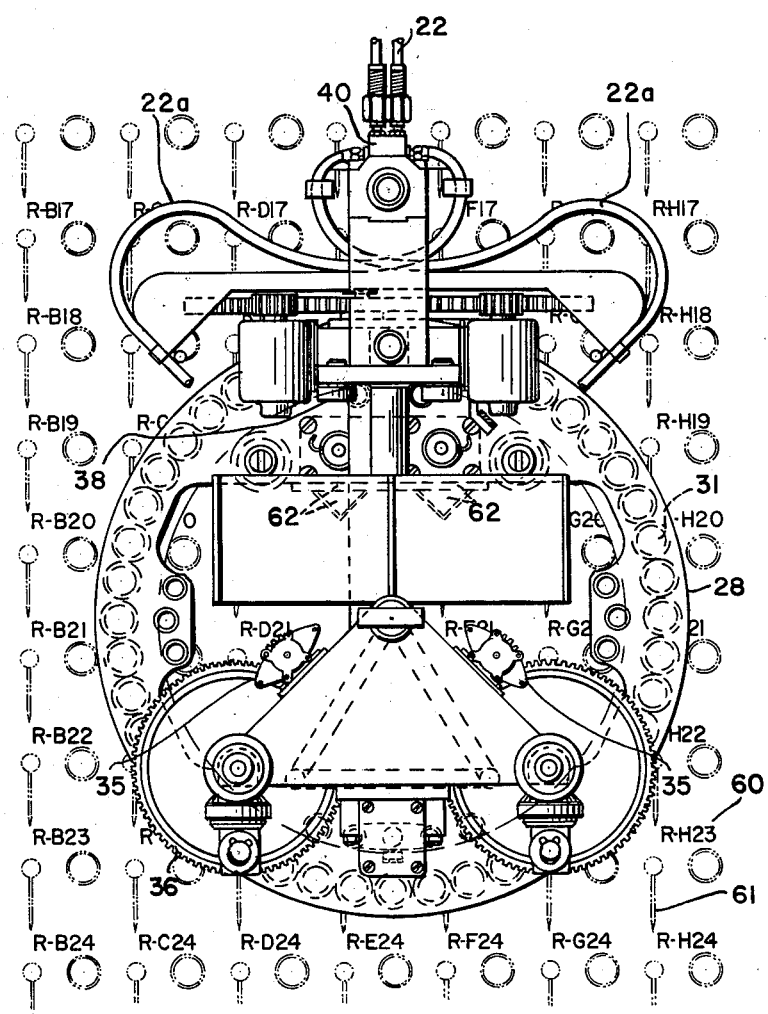
FIGURE 3 is a rear view, looking toward a fuelling face of the reactor, of the charge-discharge machine shown in FIGURES 1 and 2.

FIGURES 3, 4 and 5 illustrate details of the general arrangement of a charge-discharge machine 11. A charge-discharge machine consists of a multi-hole magazine 28 which is rotationally indexed by an internal cam 29 and a pneumatic plunger operated roller 30. The fuel slugs, either new or spent, fit into holes 31 in the magazine 28. A plunger 32 which pushes the fuel elements out of magazine holes 31 is operated by pneumatic motors 33 and gear train 34. The motion of the charge-discharge machine 11 along the horizontal tracks 12 is imparted by pneumatic motors 35, gear trains 36 and wheels 37. Other wheels 38 and 39 restrain the entire charge-discharge machine 11 to the horizontal tracks 12. The multiple core flexible metallic hose 22 terminates in the charge-discharge machine in an oscillating junction block 40. From there individual flexible metallic hoses 22a go to the various pneumatic motors and other pneumatic operated devices on the charge-discharge machine. The operation of the charge-discharge machine is straightforward. It is located opposite a reactor fuel channel 2 (FIGURE 1) and the plunger 32 pushes a fuel element out of one of the holes 31 in the magazine 28 and into the reactor fuel channel. If the charge-discharge machine is being used to receive spent fuel elements it is located opposite a reactor fuel channel 2 (FIGURE 1) and receives the spent fuel element which is pushed out of the fuel channel by the charge-discharge machine on the opposite face of the reactor.

The details of the elevator shafts 15 and heads 18 are shown in FIGURES 6, 7a, 7b, and 8. These devices, as their name implies, are used to raise and lower the charge-discharge machines 11. They are gas-tight vessels connected to the tops of elevator shafts 15. Each elevator head 18 contains a large clock spring operated drum 41 on which the multiple core flexible metallic hose 22 is wound; power driven chain sprockets 42 which operate dolly chains 19a; clock spring operated chain take-up reels 43; a power head 44 for driving chain sprockets 42; a gas-tight low-pressure glove box 45; a gas lock 46; a shield gate 47; a slug dumper 48; a multiple core gas inlet hose 49; a hose junction box 50; and a small diameter hose reel 51. The purpose of items 51, 50, 49, and 41, is to get the high pressure gas required to operate the pneumatic devices of the charge-discharge machines 11 from the outside into the pressure tight vessel without having to use other than static seals. The purpose of items 45, 46, and 47 is to enable new fuel elements to be inserted into the charge-discharge machine 11 without allowing gas to escape from the elevator head 18. The purpose of items 42, 43 and 44 is to raise and lower the dollies 19 and 20 and to lock the dolly 19 to the horizontal tracks 12. The purpose of item 48 is to turn spent fuel slugs discharged from the charge-discharge machine 11 into the vertical position so they will slide down a discharge chute 98.

The spent fuel element handling equipment is shown in FIGURE 1. It consists of a shielded flask 52, two valves 53, a liquid expansion tank 54, an isolating valve 55, and interconnecting piping 56. The liquid in the flask 52, the expansion tank 54, and the interconnecting piping and valves is trichloroethylene or some other liquid that is compatible with uranium monocarbide and graphite, the preferred fuel and sheathing material. Spent fuel elements sliding down the discharge chute 98 will be slowed down by the gas entrapped in front of them. They will be further slowed down upon entering the liquid in the pipe 56. When the flask 52 has received its complement of spent fuel elements, valves 53 are closed, the interconnecting pipe drained of liquid and disconnected. Then the flask 52 is transported bodily with its contained spent fuel elements to the spent fuel element disposal facility.

The correct horizontal position of a charge-discharge machine 11 within the reactor vessel 3 is determined by observing the fuel channel numbers 60 (FIGURE 3) and indexing marks 61 which are engraved on the charging faces 13 of the reactor in relation to the site indicators 62 all of which are reflected in one or other of 45° mirrors 63 (FIGURES 4 and 5) on the charge-discharge machines 11. The observation of these reflections from a mirror 63 is done with the aid of periscope 27 as illustrated in FIGURE 2.

The method of pushing an irradiated fuel slug into the magazine 28 of a charge-discharge machine 11 is illustrated by FIGURE 4. Suppose this charge-discharge machine is the one which is receiving the irradiated or "spent" fuel slugs. The object is to get the spent fuel slugs fully into holes 31 (FIGURES 3 and 4) of the magazine 28 without leaving a fuel slug bridging the gap 64 between the face of the charge-discharge machine 11 and the charging face 13 of the reactor. This is accomplished as follows: Ram 32 is moved towards the reactor until plunger 65 engages slot 66 in the ram 32. Then all the fuel slugs in the fuel channel are pushed by the ram of the charging charge-discharge machine at the opposite face of the reactor until the outermost spent fuel slug is pushed into the receiving charge-discharge machine and is stopped by coming in contact with the end of the ram 32. In this position the opposite end of this spent fuel slug will be just within the interior inclined stationary surface 67 of the front face of the charge-discharge machine. Then ram 32 of the receiving charge-discharge machine is fully retracted and the magazine is indexed one space. During this operation the spent fuel slug is pushed fully into its hole in the magazine by coming in contact with the inclined surface 67. The indexing of magazine 28 places an empty hole 31 opposite ram 32. Thus ram 32 can be moved to push the fuel slug which is left protruding from pile face 13 back to its normal position 68. This, of course, can only be done after the ram of the charging charge-discharge machine on the opposite face of the reactor has been retracted. The correct position 68 of the fuel slug within the reactor is determined by plunger 65 engaging slot 69 in ram 32.

The charge-discharge machines 11 are held in correct alignment with the fuel channels 2 by pointed plungers 70 which are stroked by pneumatic cylinders 71 (FIGURE 4). Plungers 70 mate with blind holes 72 in the reactor charging faces 13 when extended.

The method of raising and lowering the dolly 19 and of locking the dolly 19 onto horizontal tracks 12 is illustrated in FIGURES 10, 11, 12 and 13. The two chain sprockets 42 are driven by a worm gearmotor 73 to raise and lower the dolly 19 by chain 19a. The drive from the worm gearmotor 73 to the chain sprockets 42 is via concentric shafts 74 and 75, bevel gear wheels 76 each of which connects to one of the shafts 74 and 75, a differential frame 77, a shaft 78 and a differential pinion 79. If the differential pinion 79 is locked by a worm gearmotor 80 which is fastened solidly to the shaft 78 and the differential frame 77, parts 42, 74, 75, 76, 77, 78, 79 and 80 will revolve around the centre line of the shafts 74 and 75 when driven by the worm gearmotors 73. If the worm gearmotor 73 is stopped (both worm gearmotors 73 and 80 are the self-locking type) and the gearmotor 80 is operated, the differential bevel gear wheels 76 and the chain sprockets 42 will rotate in opposite senses of direction by the pinion 79. This will cause an integral double chain sprocket 81 and its shaft 82 to rotate. If a horizontal key 83 is in place, a concentric shaft 84 and an integral double bell crank 85 will also rotate. This will move forks 86 causing them to engage or disengage on the horizontal static tracks 12. The horizontal key 83 is a part of the charge-discharge machine 11 and is normally held in the horizontal position by clock springs 87. Thus when charge-discharge machine 11 moves away from the dolly 19 along the horizontal tracks 12, the dolly 19 cannot be unlocked from the horizontal tracks 12 regardless of any attempts to operate the gearmotors 80 and 73. When the charge-discharge machine 11 returns to the dolly 19 and the horizontal key 83 is in place, operating the gearmotor 80 will turn the shaft 82 and through the key 83 it will also turn the shaft 84 until the key 83 and its mating keyway are at an angle to the horizontal and the forks 86 are fully retracted. The key 83 will then be firmly locked to the dolly 19 by the housing 88 and thus the charge-discharge machine 11 will be prevented from leaving the dolly 19. Then the dolly 19 and the charge-discharge machine 11 can be raised or lowered by operating the worm gearmotor 73.

Fresh fuel slugs are inserted into the charge-discharge machines 11 through the glove box 45 (FIGURES 7A and 8). This is done as follows: the glove box 45 (of well known construction) is opened and a supply of canned fresh fuel slugs is put into it. The glove box 45 is then closed, purged and filled with helium at atmospheric pressure. By reaching through the gloved openings, a fuel slug is removed from its can (the cans may be similar to a solder-sealed cylindrical cigarette tins). A valve 90 (FIGURE 8) is opened and the fuel slug is manually pushed into the gas lock 46. The valve 90 is then closed and the plunger 92 is inserted through it via a hole in its plug. The gas lock 46 is then pressurized with helium to the pressure prevailing in the elevator head 18. The valve 91 and the shield gate 47 are opened and the plunger 92, operated by a chain and sprocket drive, is used to push the fuel slug into magazine 28 of charge-discharge machine 11 through the lead shielding gate 47. The plunger 92 is then partially retracted, the lead shield gate 47 and the valve 91 are closed and the gas lock 46 is vented to a helium atmospheric pressure tank (not shown). The plunger 92 is fully retracted, the valve 90 opened, the magazine 28 of charge-discharge machine 11 indexed and the whole operation repeated with a new fuel slug. To minimize the loss of helium a pump may be used to return the helium from the atmospheric pressure tank to the supply tank which provides the pressurizing helium for the gas lock 46.

Figure 6:
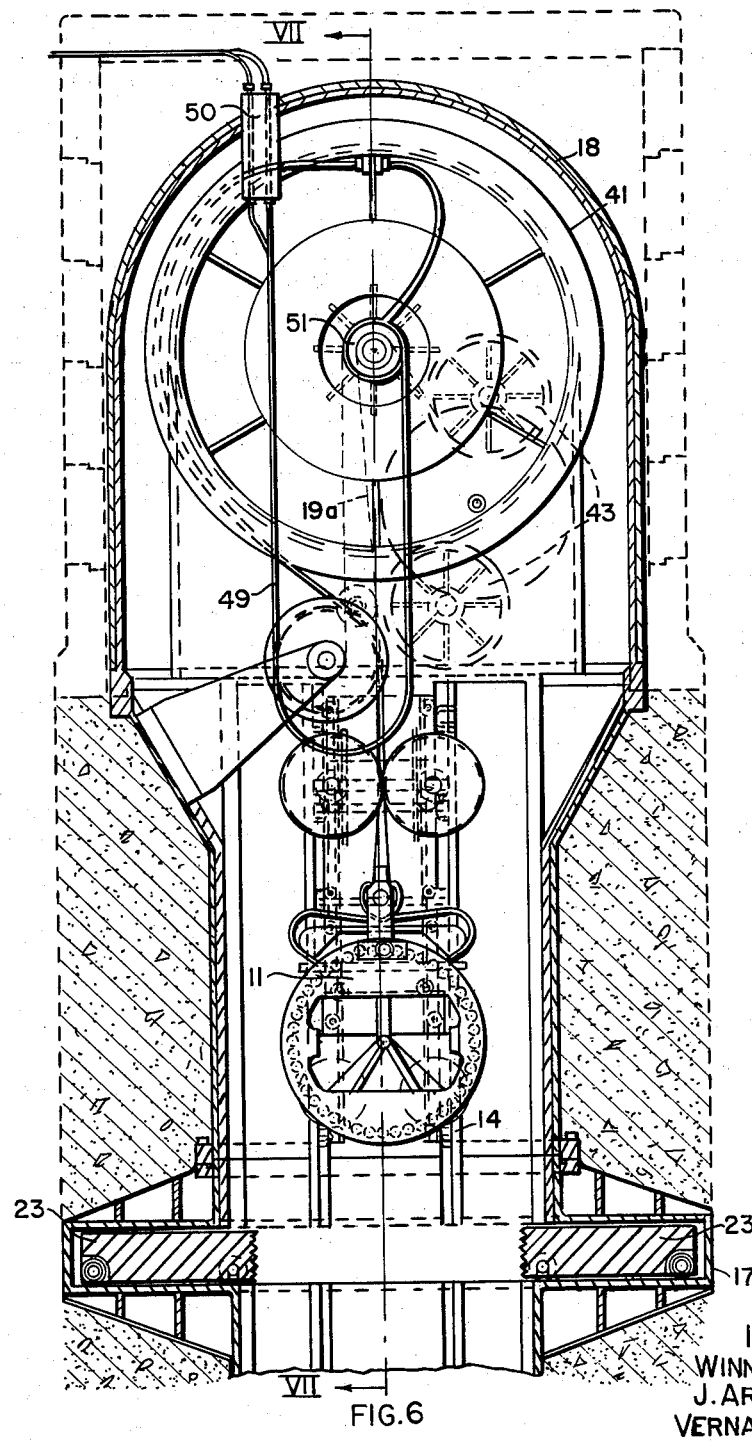
FIGURE 6 is a section taken on the line VI—VI of FIGURE 7A, showing an elevator shaft head of the apparatus shown in FIGURES 1 and 2.
Figure 9:
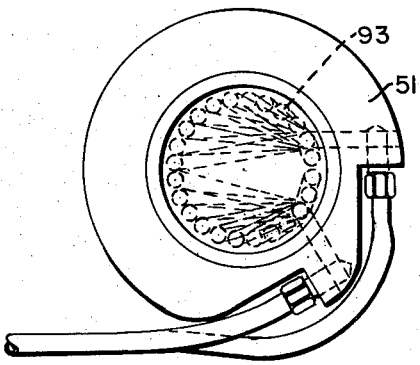
FIGURE 9 is a detail view of a coupling pulley used for high pressure helium hose lines for each elevator shaft head.
Figure 7B:
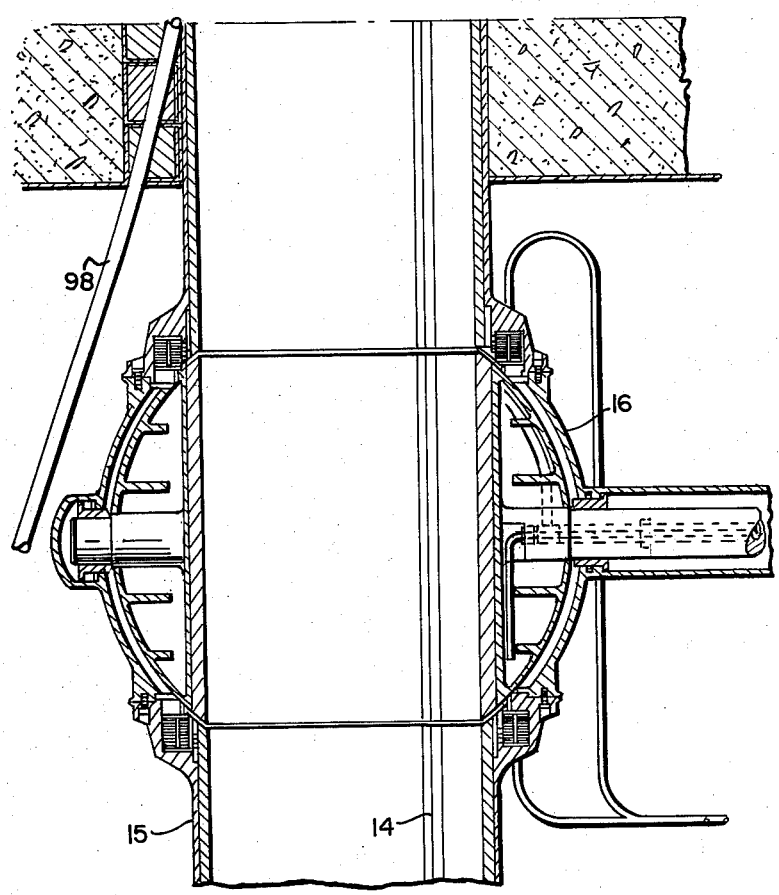
FIGURE 7B is a downward extension of FIGURE 7A.
Figure 10:
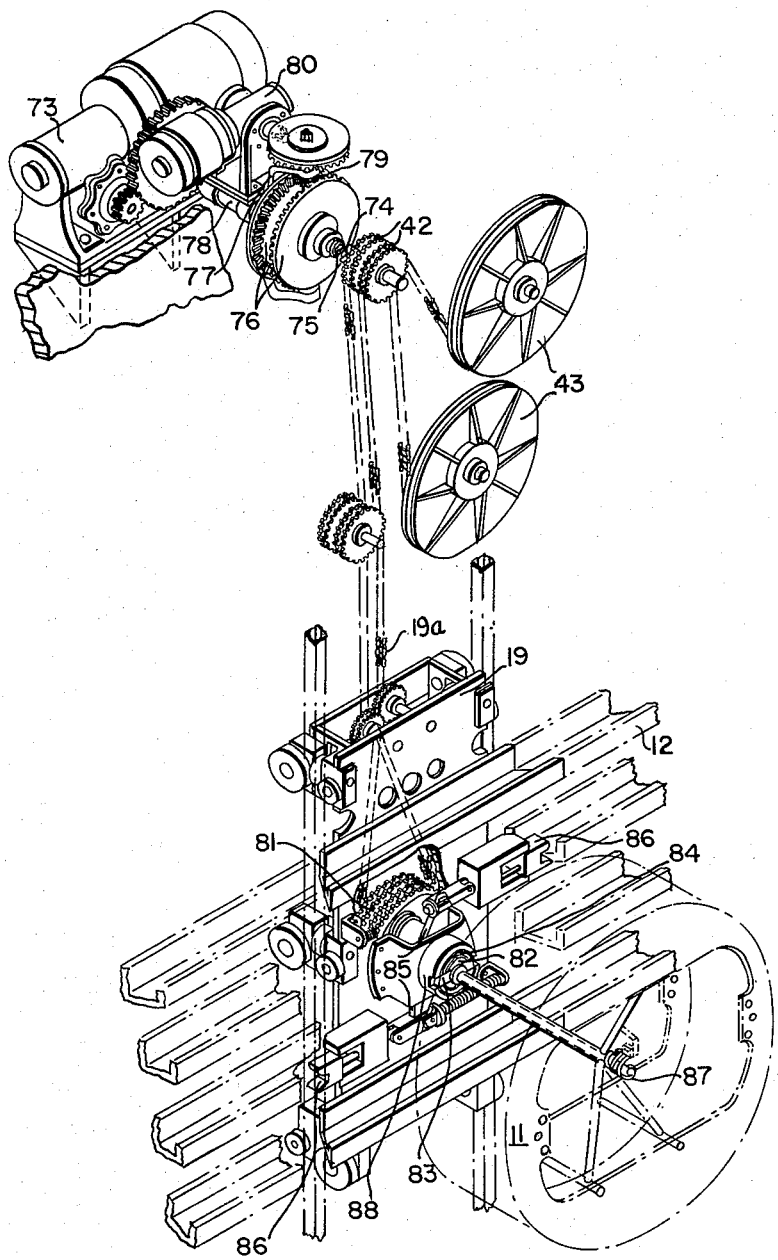
FIGURE 10 is a perspective view of the machinery for raising, lowering and locking an elevator dolly.
Figure 13:
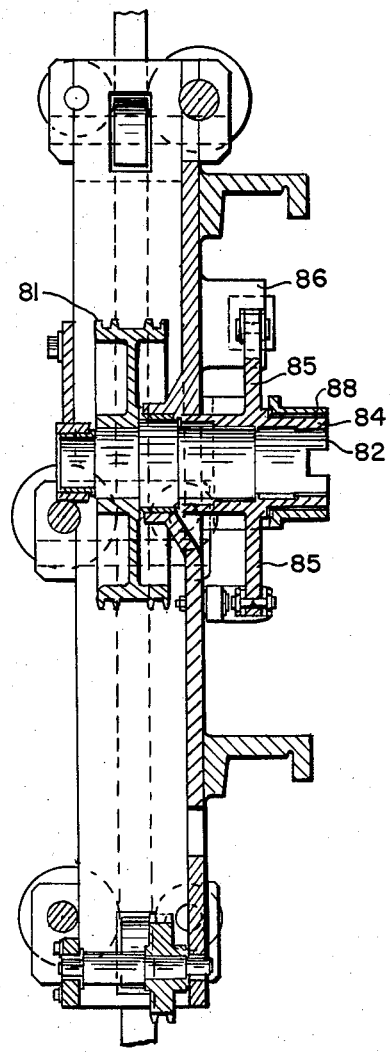
FIGURE 13 is a longitudinal cross section taken on the line XIII—XIII of FIGURE 11.

The various high pressure helium supply lines are run from the outside of elevator heads 18 into the charge-discharge machines 11 without the use of dynamic seals, i.e. rotating or sliding seals, by the following means: The helium supply lines pass from the outside to the inside of the elevator head 18 through the junction box 50 (FIGURE 6). The supply lines then become reinforced rubber hoses bound together to form a flat belt of hoses 49 which layer wind onto small pulley 51 (FIGURES 6 and 9). From the small pulley (or sheave) 51 to the large sheave 41 are a series of drilled passages 93 and static pipes 94. The static pipes 94 connect through the periphery of the sheave 41 to the multiple flexible metallic hose 22 (FIGURE 1), which in turn connects to the charge-discharge machine 11 through the oscillating junction box 40 (FIGURE 3). As the sheave 41 is about 8 feet in diameter it coils up approximately 100 feet of multiple flexible metallic hose 22 in 4 revolutions while the small sheave 51 coils up a relatively few feet of the hoses 49. This method of avoiding dynamic seals aids in keeping helium leakage down to an absolute minimum.

Figure 14:
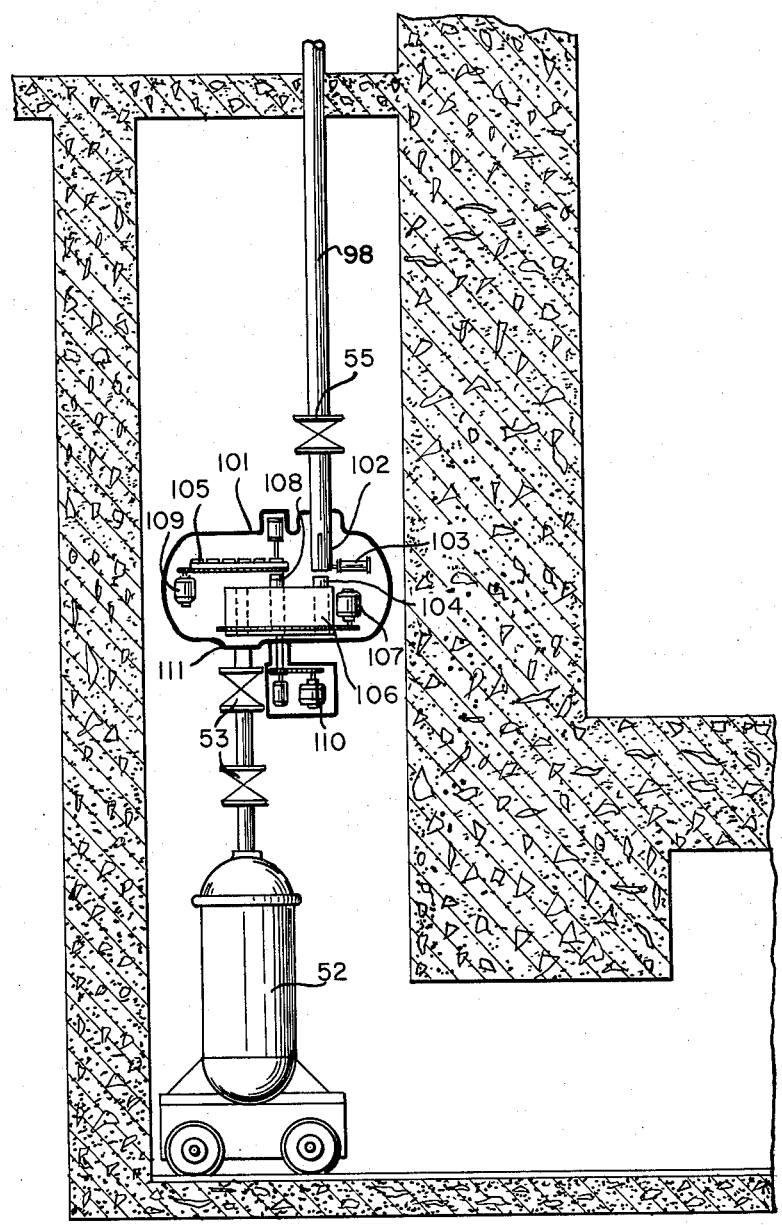
FIGURE 14 is a detail view of alternative apparatus for handling spent fuel elements.

If desired the apparatus shown in FIGURE 1 for handling the spent fuel elements (i.e. the shielded flask 52, the valves 53, the expansion tank 54 and the interconnecting piping 56) may include apparatus as shown in FIGURE 14 for canning the spent fuel elements. In FIGURE 14, below the isolating valve 55 there is located a gas filled pressure vessel 101 operating at reactor pressure and containing a machine composed of well known components for directing a falling spent fuel element into a tubular can 104, welding a cap on the can and then discharging the canned fuel element through a gas lock formed by valves 53 into a gas filled, or partially liquid filled, flask 52. The flask 52 is used to transport the canned spent fuel elements to a spent fuel element storage pond. The machine illustrated in FIGURE 14 comprises: a collet type retarder 102, collet operator means 103, a main indexing turret 106 for the cans 104, a main turret drive 107, a welding station 108, a turret 105 for the caps, a drive 109 for the turret 105, a can rotating drive 110 at the welding station, and a canned fuel element discharge station 111. The apparatus shown in FIGURE 14 is contained in a shielded vault such as that shown in FIGURE 1 for the fuel discharge apparatus. Fresh cans for the spent fuel elements and their caps are placed in the machine by well known methods such as through a valved opening using atmospheric glove boxes with the gas pressure in the canning machine pressure vessel reduced to atmospheric pressure.

What we claim as our invention is:

1. A horizontally-fuelled, closed circuit, gas-cooled nuclear reactor, comprising a reactor pressure vessel; a graphite moderated reactor within said reactor pressure vessel and adapted to hold horizontally-positioned ceramic fuel elements; charging means for inserting said fuel elements into said reactor; discharging means for removing spent fuel elements from said reactor; removal means for discharging said spent fuel elements from said discharging means; elevator pressure vessel means communicating with and extending upwardly from the main reactor pressure vessel, and housing said charging and discharging means and said removal means; said elevator pressure vessel means being subject to and capable of withstanding the gas pressure prevailing in the main reactor pressure vessel; a centrally-interrupted horizontal static track system opposite each fuelling face of said reactor and upon which said charging and discharging means are adapted to ride; a vertical track centrally interrupting each of said horizontal static track systems and extending upwardly into said elevator pressure means; supply means communicating with said elevator pressure means and adapted to insert said fuel elements into said charging means; elevating means for moving said charging and discharging means along said vertical track between the face of said reactor and the interior of said elevator pressure vessel means and means for ejecting said spent fuel elements from the pressure zone of said pressure vessel.

2. A horizontally-fuelled, closed circuit, gas-cooled nuclear reactor, comprising a reactor pressure vessel; a graphite moderated reactor within said reactor pressure vessel and adapted to hold horizontally-positioned ceramic fuel elements; charging means for inserting said fuel elements into said reactor and discharging means for removing spent fuel elements from said reactor; said charging means comprising a fuel magazine, means for positioning said magazine with relation to the charging face of said reactor, and means for transferring fuel elements between said magazine and said reactor; means for effecting a transfer of said spent fuel elements from said reactor to said discharging means; removal means for receiving said spent fuel elements from said discharging means; elevator pressure vessel means communicating with and extending upwardly from the main reactor pressure vessel, and housing said charging and discharging means and said removal means; said elevator pressure vessel means being subject to and capable of withstanding the gas pressure prevailing in the main reactor pressure vessel; a centrally-interrupted horizontal static track system opposite each fuelling face of said reactor and upon which said charging and discharging means are adapted to ride; a vertical track centrally interrupting each of said horizontal static track systems and extending upwardly into said elevator pressure means; glove box communicating with said magazine and adapted to insert said fuel elements into said magazine; elevating means for moving said charging and discharging means along said vertical track between the face of said reactor and the interior of said elevator pressure vessel means; and means for ejecting said spent fuel elements from the pressure zone of said pressure vessel.

3. A horizontally-fuelled, closed circuit, gas-cooled nuclear reactor, comprising a reactor pressure vessel; a graphite moderated reactor within said reactor pressure vessel and adapted to hold horizontally-positioned ceramic fuel elements; charging means for inserting said fuel elements into said reactor; discharging means for removing spent fuel elements from said reactor; removal means for discharging said spent fuel elements from said discharging means; elevator pressure vessel means communicating with and extending upwardly from the main reactor pressure vessel, and housing said charging and discharging means and said removal means; said elevator pressure vessel being subject to and capable of withstanding the gas pressure prevailing in the main reactor vessel, and having isolating valves adapted to permit removing said charging and discharging means from said reactor while maintaining the prevailing pressure in said elevator pressure vessel means below said isolating valve and in said reactor pressure vessel; a centrally-interrupted horizontal static track system opposite each fuelling face of said reactor and upon which said charging and discharging means are adapted to ride; a vertical track centrally interrupting each of said horizontal static track systems and extending upwardly into said elevator pressure means; supply means communicating with said elevator pressure vessel means and adapted to insert said fuel elements into said charging means; elevating means for moving said charging and discharging means along said vertical track between the face of said reactor and the interior of said elevator pressure vessel means; and means for ejecting said spent fuel elements from the pressure zone of said pressure vessel.

4. In a horizontally-fuelled, closed circuit, gas-cooled nuclear reactor, elevator pressure vessel means associated with said reactor and containing therein fuel element charging and discharging means; said fuel element charging and discharging means comprising a magazine adapted to receive a supply of fuel elements; indexing means to position said magazine means with respect to the charging face of the reactor; a plunger for transferring said fuel elements from said magazine to said reactor and for removing spent fuel elements from said reactor; means for actuating said plunger; and means for ejecting said spent fuel elements from the pressure zone of the pressure vessel of said nuclear reactor; a centrally-interrupted horizontal static track system opposite each fuelling face of said reactor and upon which said charging and discharging means are adapted to ride; a vertical track centrally interrupting each of said horizontal static track systems and extending upwardly into said elevator pressure means; said elevator pressure vessel means being subject to and capable of withstanding the gas pressure prevailing in said pressure vessel.

5. Elevator pressure vessel means in accordance with claim 4 further characterized as having a spent fuel element tipper, and a spent fuel discharge chute located outside said elevator pressure vessel means and communicating with said discharging means.

6. A horizontally-fuelled, closed circuit, gas-cooled nuclear reactor, comprising a main reactor pressure vessel; a graphite moderated reactor within said main reactor pressure vessel; a pair of elevator pressure vessels communicating with and extending upwardly from the main reactor pressure vessel, said elevator pressure vessels being subject to and capable of withstanding the gas pressure prevailing in the main reactor pressure vessel; charging means for inserting ceramic fuel elements into said reactor; discharging means for removing spent fuel elements from said reactor; a centrally-interrupted horizontal static track system opposite each fuelling face of said reactor and upon which said charging and discharging means are adapted to ride; a vertical track centrally interrupting each of said horizontal static track systems and extending upwardly into said elevator pressure means; elevating means within said elevator pressure vessels for moving said charging and said discharging means along said vertical track between the faces of said reactor and the interior of said elevator pressure vessels; supply means communicating with said charging means in said elevator pressure vessels for inserting fuel elements into said charging means; removal means associated with said discharging means positioned within said elevator pressure vessel for removing said spent fuel elements from said discharging means; and means for ejecting said spent fuel elements from the pressure zone of said vessels.

7. Reactor in accordance with claim 6 wherein said charging and discharging means comprise a magazine; means for positioning said magazine with relation to the charging faces of said reactor; and means for transferring fuel elements between said magazine and said reactor.

8. Reactor in accordance with claim 6 wherein said elevator pressure vessels are equipped with isolating valves adapted to permit removal of said charging and discharging means therefrom while maintaining gas pressure in said elevator pressure vessels below said isolating valves.

References Cited in the file of this patent

UNITED STATES PATENTS

| | | |
|---|---|---|
| 2,725,993 | Smith | Dec. 6, 1955 |
| 2,780,596 | Anderson | Feb. 5, 1957 |
| 2,850,447 | Ohlinger et al. | Sept. 2, 1958 |

FOREIGN PATENTS

| | | |
|---|---|---|
| 1,045,003 | Germany | Nov. 27, 1958 |
| 560,765 | Belgium | Sept. 30, 1957 |

OTHER REFERENCES

Research Reactors (TID 5275), October 1955, pp. 418–421.

Plessiflex, Nuclear Power, December 1957 (vol. 2, No. 20), pp. A42.